(12) United States Patent
Morris et al.

(10) Patent No.: US 9,340,184 B1
(45) Date of Patent: May 17, 2016

(54) MOTORIZED CAR WASH DEVICE

(71) Applicants: Patrick Morris, Ft. Lauderdale, FL (US); Chovanne Williams, Ft. Lauderdale, FL (US)

(72) Inventors: Patrick Morris, Ft. Lauderdale, FL (US); Chovanne Williams, Ft. Lauderdale, FL (US)

( * ) Notice: Subject to any disclaimer, the term of this patent is extended or adjusted under 35 U.S.C. 154(b) by 40 days.

(21) Appl. No.: 14/522,253

(22) Filed: Oct. 23, 2014

(51) Int. Cl.
*A46B 13/04* (2006.01)
*B60S 3/06* (2006.01)
*B60S 3/04* (2006.01)

(52) U.S. Cl.
CPC ............... *B60S 3/048* (2013.01); *A46B 13/04* (2013.01); *A46B 2200/3046* (2013.01)

(58) Field of Classification Search
CPC .. A46B 13/04; A46B 2200/3046; B60S 3/048
USPC ........................................ 15/24, 29
See application file for complete search history.

(56) References Cited

U.S. PATENT DOCUMENTS

| | | | | |
|---|---|---|---|---|
| 3,501,798 A * | 3/1970 | Ennio | ......................... | A47L 1/02 15/103 |
| 3,731,334 A * | 5/1973 | Carbonell | ............. | A47L 11/283 15/144.2 |
| 3,943,591 A * | 3/1976 | Lanusse | ................. | A46B 13/04 15/29 |
| 4,254,526 A * | 3/1981 | Fromm | .................. | A46B 13/04 15/24 |
| 4,335,481 A * | 6/1982 | Slayman | ................ | A46B 13/04 15/29 |
| 4,399,578 A * | 8/1983 | Bordeaux | ............... | A47L 11/12 15/230 |
| 5,289,605 A | 3/1994 | Armbruster | | |
| 5,423,102 A * | 6/1995 | Madison | ................ | A46B 13/04 15/22.1 |
| 5,964,003 A * | 10/1999 | Rogers | .................... | A47L 13/22 15/28 |
| 6,374,447 B1 * | 4/2002 | Armbruster | .......... | A46B 13/008 15/144.1 |
| 6,748,619 B2 | 6/2004 | Quach | | |
| 7,530,136 B1 * | 5/2009 | Ball | ...................... | A46B 5/0033 15/103 |
| 8,347,443 B1 | 1/2013 | Conrad | | |
| 8,601,631 B1 * | 12/2013 | Martin | ................... | A46B 13/04 15/29 |
| 2002/0104177 A1 * | 8/2002 | Wong | ................... | A46B 13/008 15/28 |
| 2004/0117931 A1 * | 6/2004 | Washington | ......... | A46B 13/008 15/29 |

* cited by examiner

*Primary Examiner* — Mark Spisich
(74) *Attorney, Agent, or Firm* — Crossley & Stevenson IP Law

(57) ABSTRACT

A motorized car wash device having a hand held washer with a telescopic handle for reaching up to ten feet, as well as a sealed control tube featuring a plurality of control buttons. The tube is connected to a head by a double ear axle joint. The head includes a soap reservoir. A soap pump and soap jets are disposed on a bottom side of the head. Variable speed choices are available for multi-speed motorized direct drive of a receiver selectively holding a plurality of spinning brushes and pads. Pivoting lights provide use of the device in low light conditions. Each of the pump, the jets, the multi-speed motor and the lights in operational communication with the control buttons and batteries.

10 Claims, 4 Drawing Sheets

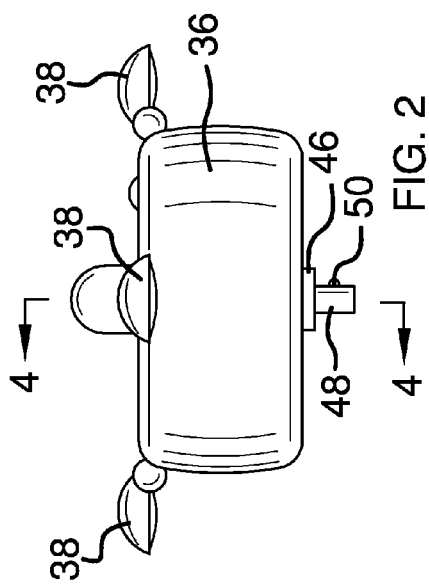
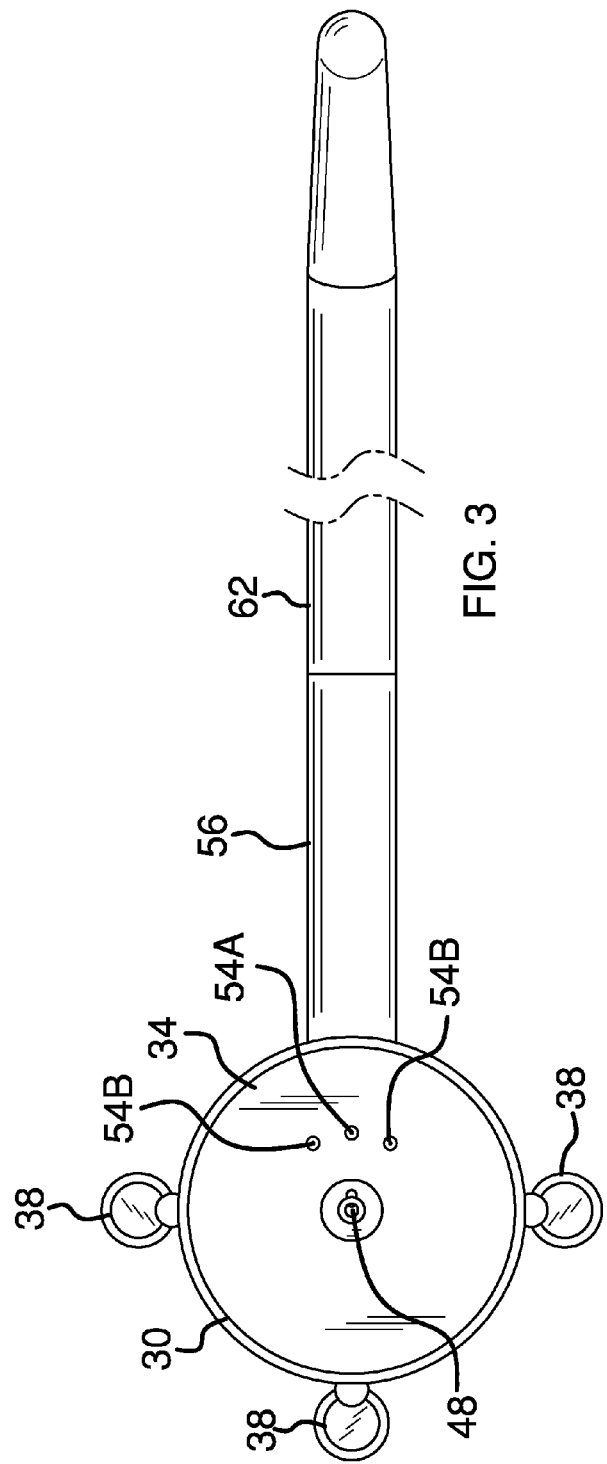

MOTORIZED CAR WASH DEVICE

BACKGROUND OF THE INVENTION

Various types of motorized car wash devices are known in the prior art. Many partially comprise an implement affixed to a telescopic handle. While a ball and socket handle-to-implement for contacting a surface is sometimes useful, such devices do not accommodate various tools and attachments needing a measurable amount of specifically and directionally applied pressure. A more rigid connection between implement and handle is often needed, a connection that provides for a multitude of uses without a fear of failure or excess flexing. Additionally, an angled handle-to-implement connection is needed to ergonomically address surfaces, such as car surfaces, for best cleaning results.

Sprays often need direct or multidirectional spray patterns, yet few if any devices provide such. Car washing devices also need multiple attachments and multiple speed attachment drives to enable application to the multitude of car surfaces. No previously proffered device provides the advantages of the current motorized car wash device with features that include a telescopic handle for reaching up to ten feet, a sealed control tube connected to a sealed head by a double ear axle joint, the head having a soap reservoir, a soap pump and liquid jets in a bottom side of the head, the jets providing direct and wide pattern spray, variable speed choice for multi-speed motorized direct drive of a receiver selectively holding a plurality of attachments, a double ear axle joint having an angled extension from the head, and pivoting lights for convenience in using the device in low light conditions.

FIELD OF THE INVENTION

The present invention relates to a car wash device, and more particularly, to a motorized car wash device that is hand held.

SUMMARY OF THE INVENTION

The general purpose of the motorized car wash device, described subsequently in greater detail, is to provide a motorized car wash device that has many novel features that result in a motorized car wash device which is not anticipated, rendered obvious, suggested, or even implied by prior art, either alone or in combination thereof.

To accomplish this, the motorized car wash device comprises a hand held washer. A sealed head having a top side spaced apart from a bottom side by a perimeter is provided. A plurality of spaced apart pivoting lights is disposed on the perimeter adjacent the top side. The pivoting lights importantly provide improved vision in use of the device in low light conditions.

A reservoir is disposed within the head, the reservoir forming a torus within the perimeter. A fill cap is disposed on the top side and is in operational communication with the reservoir. Various liquids may be used with the device, whether water, soap solutions, waxes, or any other desired applicant. A multi-speed motor is centrally disposed within the head within a center of the torus. A seal is disposed on the bottom side proximal the multi speed motor. The torus-shaped reservoir surrounds the multi speed motor to achieve better balance of the head. This is especially important with the telescopic handle extension capability. A receiver is extended from the multi speed motor through the seal. The seal prevents foreign material from passing into the head. A detent pin is disposed in the receiver.

A pump powers output from the reservoir. A plurality of at least one direct spray jet and wide pattern jets are disposed in the bottom side. The direct spray jets and the wide pattern jets are in operational communication with the pump. A sealed control tube is connected to the head. A plurality of sealed buttons is disposed on the control tube, the sealed buttons controlling a plurality of functions including an on/off of the multi speed motor, a multi speed motor speed, the pump, a selection of the direct spray jets and the wide pattern jets, and the pivoting lights.

The control tube is connected to the head via a double ear axle joint. The joint importantly provides a rugged stability for a user as opposed to a multi-directional joint. A plurality of batteries is disposed within the control tube. The batteries are in operational communication with the pivoting lights, the multi speed motor, the pump, the jets, and the sealed buttons. A telescopic handle is disposed on the control tube most distal the first end. The telescopic handle has a telescopic range of up to approximately ten feet. A bend is disposed in the telescopic handle at the second end for ergonomics. A frictional material is disposed on the bend to ensure grip.

A plurality of attachments is provided. Each attachment partially comprises a shaft. A plurality of brushes is provided and each brush is disposed on one shaft, respectively. A plurality of pads is provided, each pad disposed on one shaft, respectively. A plurality of cushioned fibers is provided. Each cushioned fiber is disposed on a shaft, respectively. Each shaft partially comprises a detent. Each detent is selectively engaged with the detent pin in attaching to the receiver. Each shaft detent and the detent pin are important in providing quick change of the attachments for a user.

Thus has been broadly outlined the more important features of the present motorized car wash device so that the detailed description thereof that follows may be better understood and in order that the present contribution to the art may be better appreciated.

BRIEF DESCRIPTION OF THE DRAWINGS

Figures

FIG. 2 is a first end elevation view.
FIG. 3 is a bottom plan view.

DETAILED DESCRIPTION OF THE DRAWINGS

Figure 1:
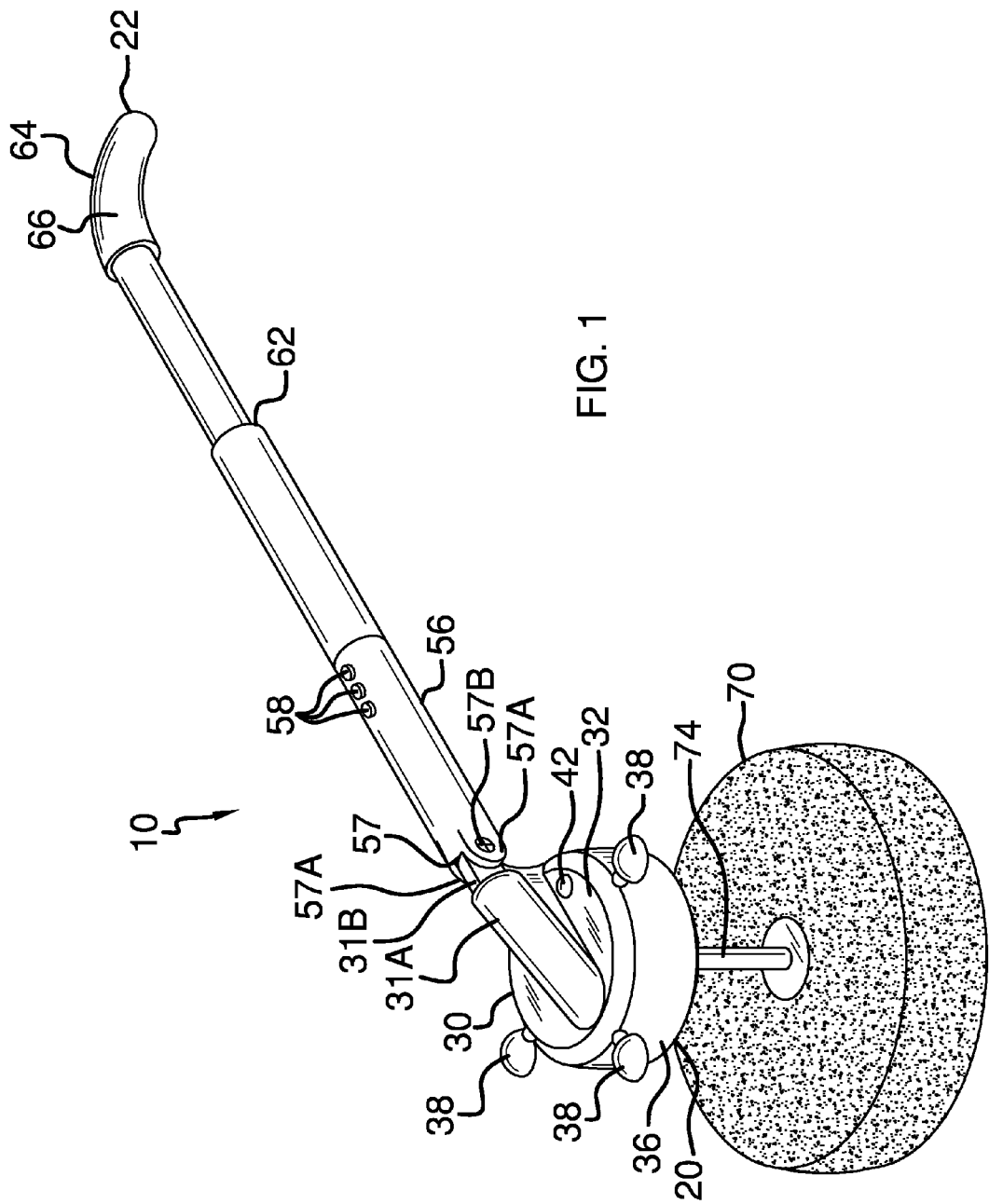
FIG. 1 is a top side first end perspective view.
Figure 4:
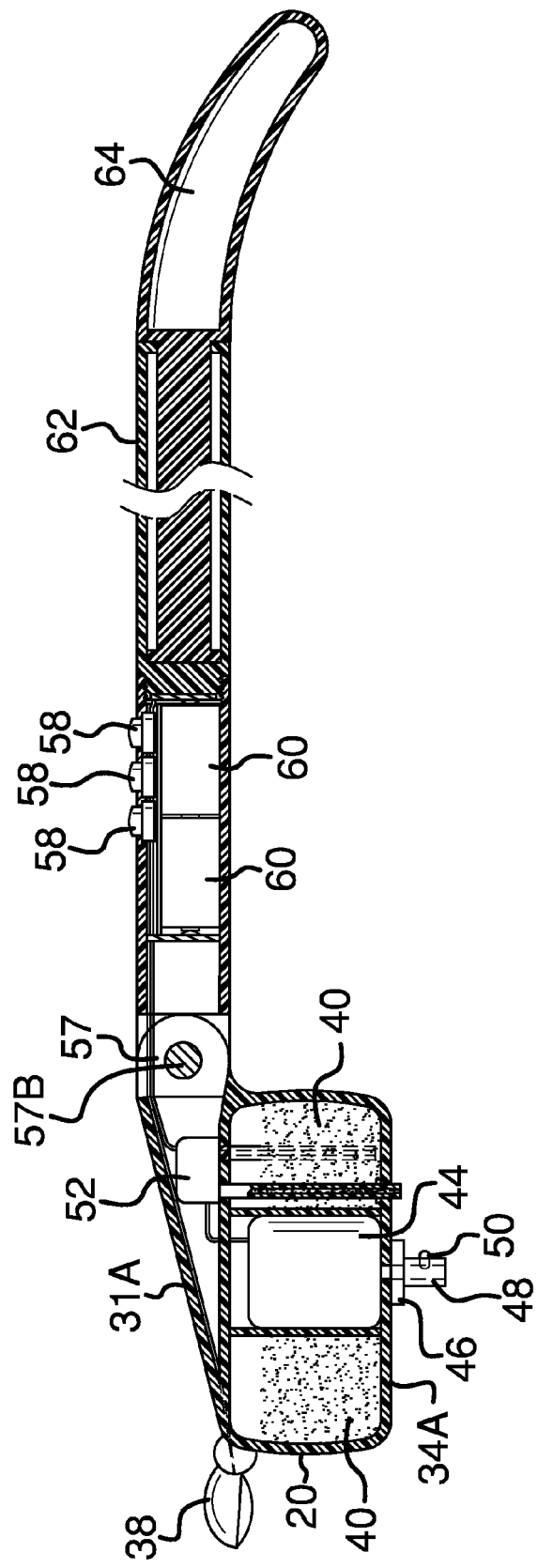
FIG. 4 is a cross sectional view of FIG. 2, taken along the line 4-4.
Figure 5:
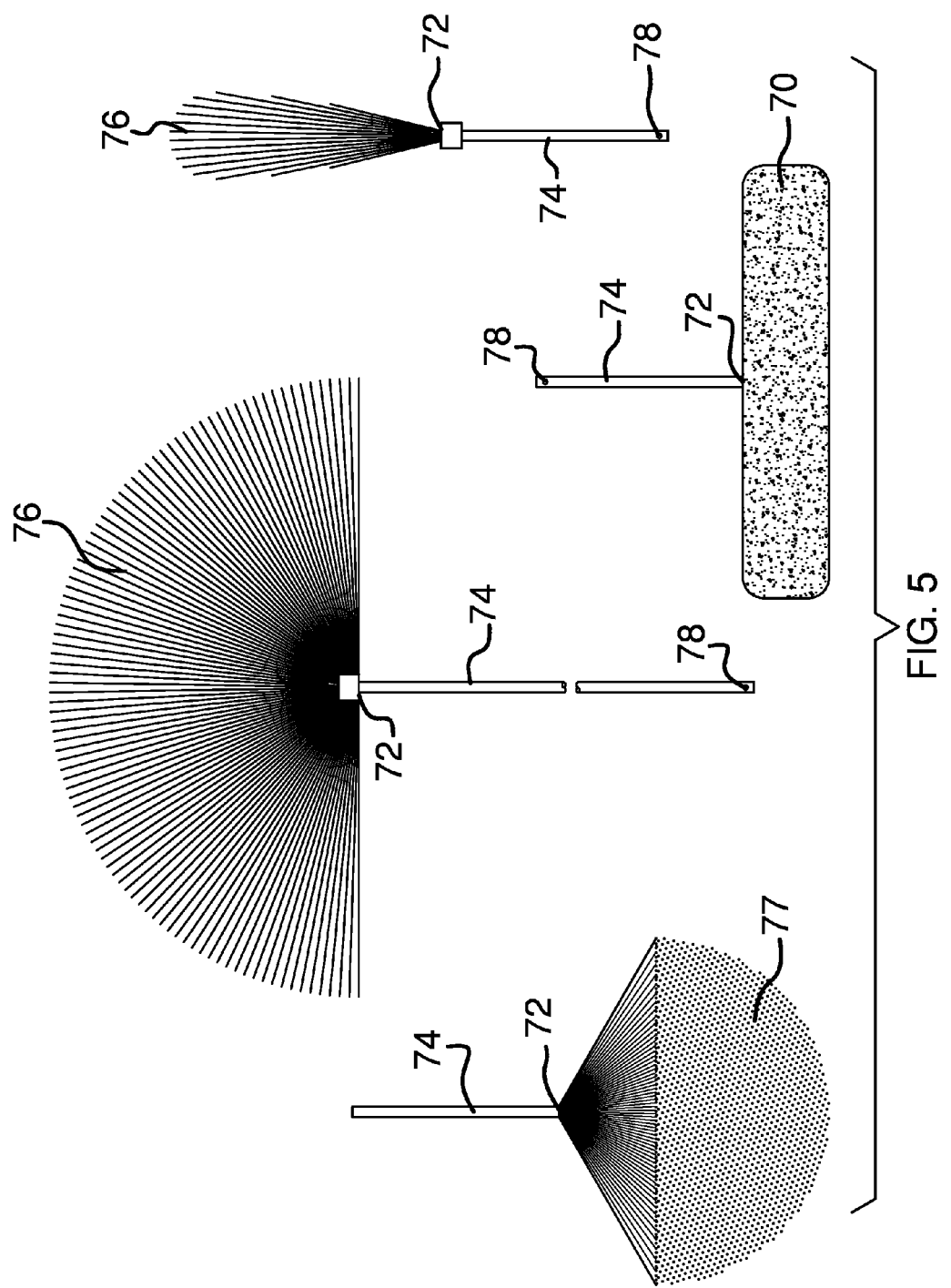
FIG. 5 is a lateral view of a plurality of attachments.

With reference now to the drawings, and in particular FIGS. 1 through 5 thereof, an example of the motorized car wash device employing the principles and concepts of the present motorized car wash device and generally designated by the reference number 10 will be described.

Referring to FIGS. 1 through 5, the motorized car wash device 10 comprises a hand held washer. A sealed head 20 having a top side 32 spaced apart from a bottom side 34A in FIG. 4 by a perimeter 36 is disposed at the first end 30. A plurality of spaced apart pivoting lights 38 is disposed on the perimeter 36 adjacent the top side 32. The pivoting lights 38 importantly provide improved vision in use of the device 10 in low light conditions. An angled extension 31A is disposed on the top side 32, the angled extension 31A having an angle within a range of approximately 15-30 degrees relative to the top side 32.

A torus reservoir 40 is disposed within the head 20 immediately within the perimeter 36. A fill cap 42 is disposed on the top side 32 and is in operational communication with the reservoir 40. A multi-speed motor 44 is centrally disposed within the head 20 within the reservoir 40. The reservoir 40 surrounds the multi speed motor 44 to achieve better balance of the head 20. A seal 46 is disposed on the bottom side 34 proximal the multi speed motor 44. A receiver 48 is extended from the multi speed motor 44 through the seal 46. A detent pin 50 is disposed in the receiver 48.

A pump 52 powers an output from the reservoir 40. At least one direct spray jet 54A and a plurality of wide pattern jets 54B are disposed in the bottom side 34, the direct spray jet 54A and the wide pattern jets 54B in operational communication with the pump 52. A sealed control tube 56 is provided. A plurality of sealed buttons 58 is disposed on the control tube 56, the sealed buttons 58 controlling a plurality of functions including an on/off of the multi speed motor 44, a multi speed motor 44 speed, the pump 52, a selection of the direct spray jet 54A and the wide pattern jets 54B, and the pivoting lights 38. A plurality of batteries 60 is disposed within the control tube 56. The batteries 60 are in operational communication with the pivoting lights 38, the multi speed motor 44, the pump 52, the direct spray jet 54A and the wide pattern jets 54B, and the sealed buttons 58.

A double ear axle joint 57 connects the sealed head 20 to the control tube 56 and provides a rigid pivoting relationship between the control tube 56 and the sealed head 20 that provides a user exact control, superior ergonomic and long lived usefulness, along with an angle of attacking a surface that has been experimentally established as ideal for a plurality of user needs. The double ear axle joint 57 is comprised of a centered arm 31B, a pair of spaced apart ears 57A, and an axle 57B. The pair of spaced apart ears 57A is disposed on the control tube 56. The ears 57A substantially surround the centered arm 31B. The centered arm 31B is extended from the angled extension 31A from a position most distal the top side 32. The axle 57B pivotally connects the ears 57A to the centered arm 31B and provides for a pivotal relationship between the sealed head 20 and the control tube 56.

A telescopic handle 66 comprises a first end spaced apart from a second end 22. The first end is connected to the control tube 56 most distal the double ear axle joint 57. The telescopic handle 62 importantly has a telescopic range of up to approximately ten feet. The design of the reservoir 40 aids in a balance of the hand held washer for a user when the telescopic handle 62 is extended. A bend 64 is disposed in the telescopic handle 62 at the second end 22. A frictional material 66 is disposed on the bend 64.

A plurality of attachments 72 is provided. Each attachment 72 comprises a shaft 74. Each shaft 74 partially comprises a detent 78. Each shaft 74 is affixed to a plurality of implements including but not limited to a plurality of pads 70, a plurality of brushes 76, and a plurality of cushioned fibers 77. Each detent of each shaft 74 is selectively engaged by the detent pin 50 of the receiver 48. The detents 78 and the detent pins 50 importantly provide for quick change of attachments 72.

What is claimed is:

1. A motorized car wash device comprising:
   a hand held washer comprising:
      a sealed head having a top side spaced apart from a bottom side by a perimeter;
      a reservoir disposed within the head;
      a fill cap disposed on the top side, the fill cap in operational communication with the reservoir;
      a multi-speed motor centrally disposed within the head;
      a seal disposed on the bottom side proximal the multi speed motor;
      a receiver extended from the multi speed motor through the seal which is adapted to couple to a cleaning attachment;
      a pump disposed within the head, the pump powering an output from the reservoir;
      a plurality of jets disposed in the bottom side, the jets in operational communication with the pump;
      a joint pivotally connected to the head;
      a sealed control tube affixed to the joint;
      a plurality of sealed buttons disposed within the control tube, the sealed buttons in operational communication with each of the motor and the pump;
      a plurality of batteries disposed within the control tube, the batteries in operational communication with each of the motor, the pump, and the buttons;
      a telescopic handle having a first end spaced apart from a second end, the first end affixed to the control tube at an end most distal the joint.

2. The device of claim 1 further comprising:
   a plurality of attachments, each attachment partially comprising a shaft;
   wherein each shaft is configured to be selectively retained within the receiver;
   a plurality of pads, each pad attached to one shaft, respectively; and
   a plurality of brushes, each brush attached to one shaft, respectively.

3. The device of claim 2 further comprising a detent in each shaft; and
   a detent pin disposed in the receiver;
   wherein each detent selectively engages the receiver via the detent pin.

4. The device of claim 2 further comprising a bend disposed in the telescopic handle at the second end; and
   a frictional material disposed on the bend.

5. The device of claim 2 wherein at least one of the jets sprays in a plurality of directions.

6. The device of claim 1 further comprising a bend disposed in the telescopic handle at the second end; and
   a frictional material disposed on the bend.

7. The device of claim 1 wherein at least one of the jets sprays in a plurality of directions.

8. A motorized car wash device comprising:
   a hand held washer comprising:
      a sealed head having a top side spaced apart from a bottom side by a perimeter;
      an angled extension disposed on the top side, the angled extension having an angle within a range of approximately 15-30 degrees relative to the top side;
      a reservoir disposed within the head;
      a fill cap disposed on the top side, the fill cap in operational communication with the reservoir;
      a multi-speed motor disposed centrally within the head;
      a seal disposed on the bottom side proximal the multi speed motor;
      a receiver extended from the multi speed motor through the seal, wherein the seal prevents a foreign material invasion of the sealed head;
      a detent pin disposed in the receiver;
      a pump disposed within the head, the pump powering an output from the reservoir;
      at least two wide pattern jets disposed in the bottom side;
      at least one direct spray jet disposed in the bottom side;
      wherein each of the direct spray jet and the wide pattern jets are in operational communication with the pump;

a telescopic handle having a first end spaced apart from a second end, the telescopic handle having a telescopic range of up to approximately ten feet;
a bend disposed on the telescopic handle at the second end;
a frictional material disposed on the bend;
a sealed control tube connected to the first end;
a plurality of sealed buttons disposed on the control tube, wherein the sealed buttons control a plurality of functions including an on/off of the multi speed motor, a speed of the multi speed motor, and an activation of each of the pump, the direct spray jet, and the wide pattern jets;
a double ear axle joint connecting the angled extension to the control tube, the double ear axle joint comprising:
 a centered arm extended from the angled extension, the centered arm most distal the top side;
 a pair of spaced apart ears disposed on the control tube, the ears most proximal the angled extension, the ears substantially surrounding the centered arm; and
 an axle pivotally connecting the ears to the centered arm;
a plurality of batteries disposed within the control tube, the batteries in operational communication with each of the multi speed motor, the pump, the jets, and the sealed buttons; and
a plurality of attachments, each attachment comprising a shaft, each shaft having a detent, each shaft affixable to a plurality of implements including pads, brushes, and cushioned fibers;
wherein each detent is selectively engaged by the detent pin.

9. The motorized car wash device of claim 8 wherein the reservoir is a torus disposed immediately within the perimeter;
 the motor surrounded by the torus;
 wherein the sealed head is balanced.

10. A motorized car wash device comprising:
a hand held washer comprising:
 a sealed head having a top side spaced apart from a bottom side by a perimeter;
 an angled extension disposed on the top side, the angled extension having an angle within a range of approximately 15-30 degrees relative to the top side;
 a plurality of spaced apart pivoting lights disposed on the perimeter adjacent the top side;
 a reservoir disposed within the head;
 a fill cap disposed on the top side, the fill cap in operational communication with the reservoir;
 a multi-speed motor disposed centrally within the head;
 a seal disposed on the bottom side proximal the multi speed motor;
 a receiver extended from the multi speed motor through the seal;
 a detent pin disposed in the receiver;
 a pump disposed within the head, the pump powering output from the reservoir;
 at least two wide pattern jets disposed on the bottom side;
 at least one direct spray jet disposed on the bottom side;
 wherein each of the direct spray jet and the wide pattern jets are in operational communication with the pump;
a telescopic handle having a first end spaced apart from a second end, the telescopic handle having a telescopic range of up to approximately ten feet;
a bend affixed to the second end;
a frictional material disposed on the bend;
a sealed control tube connected to the first end;
a plurality of sealed buttons disposed on the control tube, wherein the sealed buttons control a plurality of functions including an on/off of the multi speed motor, a speed of the multi speed motor, and activation of each of the pump, the direct spray jet, the wide pattern jets, and the lights;
a double ear axle joint connecting the angled extension to the control tube, the double ear axle joint comprising:
 a centered arm extended from the angled extension, the centered arm most distal the top side;
 a pair of spaced apart ears disposed on the control tube, the ears most proximal the angled extension, the ears substantially surrounding the centered arm;
 an axle pivotally connecting the ears to the centered arm;
a plurality of batteries disposed within the control tube, the batteries in operational communication with each of the pivoting lights, the multi speed motor, the pump, the jets, and the sealed buttons; and
a plurality of attachments, each attachment comprising a shaft, each shaft having a detent, each shaft affixable to a plurality of implements including pads, brushes, and cushioned fibers;
wherein each detent is selectively engaged by the detent pin.

* * * * *